United States Patent
Knox

(10) Patent No.: US 6,204,901 B1
(45) Date of Patent: Mar. 20, 2001

(54) LIQUID CRYSTAL COLOR SHUTTERS THAT INCLUDE REFLECTIVE POLARIZERS THAT PASS COLOR COMPONENTS OF LIGHT OF A FIRST POLARIZATION AND THAT REFLECT A MAJORITY OF COLOR COMPONENTS OF LIGHT OF A SECOND POLARIZATION

(75) Inventor: Richard M. Knox, Houston, TX (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 09/110,652

(22) Filed: Jul. 7, 1998

Related U.S. Application Data

(60) Provisional application No. 60/054,292, filed on Jul. 31, 1997.

(51) Int. Cl.[7] .................................................. G02F 1/1335
(52) U.S. Cl. ................................. 349/96; 349/97; 349/117
(58) Field of Search ............................. 349/96, 117, 119, 349/100, 97, 98, 80; 252/299.01; 348/72, 751

(56) References Cited

U.S. PATENT DOCUMENTS

| | | | |
|---|---|---|---|
| 4,268,127 * | 5/1981 | Oshima et al. ................... 350/337 |
| 4,425,028 | 1/1984 | Gagnon et al. ................... 350/337 |
| 4,544,237 | 10/1985 | Gagnon ........................... 350/331 R |
| 4,961,642 | 10/1990 | Ogino ............................... 353/38 |
| 4,969,732 | 11/1990 | Wright et al. .................... 353/77 |
| 5,122,905 | 6/1992 | Wheatley et al. ................ 359/586 |
| 5,122,906 | 6/1992 | Wheatley ........................ 359/586 |
| 5,132,826 | 7/1992 | Johnson et al. ................. 359/93 |
| 5,193,015 | 3/1993 | Shanks ............................ 359/53 |
| 5,223,869 | 6/1993 | Yanagi ............................. 353/78 |
| 5,243,455 | 9/1993 | Johnson et al. ................. 359/93 |
| 5,333,072 | 7/1994 | Willett ............................. 359/41 |
| 5,337,106 | 8/1994 | Jutamulia et al. ............... 354/152 |
| 5,347,378 | 9/1994 | Handschy et al. .............. 359/53 |
| 5,389,982 | 2/1995 | Lee ................................. 353/37 |
| 5,416,618 | 5/1995 | Juday .............................. 359/53 |
| 5,453,859 | 9/1995 | Sannohe et al. ................ 359/63 |

(List continued on next page.)

FOREIGN PATENT DOCUMENTS

| | | |
|---|---|---|
| 0 463 816 A2 | 1/1992 | (EP) . |
| 0 488 590 A1 | 6/1992 | (EP) . |
| 0648048A1 * | 4/1995 | (EP) . |
| 0 783 133 A1 | 7/1997 | (EP) . |
| 2 673 006 | 8/1992 | (FR) . |
| 61-013885 | 1/1986 | (JP) . |
| 2-211418 | 8/1990 | (JP) . |
| 03063690 | 3/1991 | (JP) . |
| 03187696 | 8/1991 | (JP) . |
| 03243932 | 10/1991 | (JP) . |
| WO 94/02879 | 2/1994 | (WO) . |
| WO 94/16355 | 7/1994 | (WO) . |
| WO 95/17692 * | 6/1995 | (WO) . |
| WO 96/37806 | 11/1996 | (WO) . |
| WO97/43862 | 11/1997 | (WO) . |

OTHER PUBLICATIONS

McGraw–Hill, Inc., *Handbook of Optics*, vol. II, Devices, Measurements and Properties, 2$^{nd}$ Ed. Ch. 3–*Polarizers* (1995) (2 title pp. & pp. 3.1–3.70).

(List continued on next page.)

*Primary Examiner*—William L. Sikes
*Assistant Examiner*—Tarifur R. Chowdhury
(74) *Attorney, Agent, or Firm*—Myers Bigel Sibley & Sajovec

(57) ABSTRACT

Color shutters that include reflecting linear polarizers can be used in projection display applications. The reflecting linear polarizers are used to reflect the light that would have been absorbed by prior art color shutters. The use of reflecting linear polarizers can resolve overheating and degradation problems of prior art system and projection display systems using sequential color operation can be built and operate reliably.

29 Claims, 10 Drawing Sheets

U.S. PATENT DOCUMENTS

| | | | |
|---|---|---|---|
| 5,467,146 | 11/1995 | Huang et al. | 348/743 |
| 5,467,154 | 11/1995 | Gale et al. | 353/119 |
| 5,486,949 | 1/1996 | Schrenk et al. | 359/498 |
| 5,517,340 | 5/1996 | Doany et al. | 359/41 |
| 5,548,422 | 8/1996 | Conner et al. | 459/65 |
| 5,557,343 | 9/1996 | Yamagishi | 348/781 |
| 5,573,324 | 11/1996 | De Vaan | 353/77 |
| 5,594,591 | 1/1997 | Yamamoto et al. | 349/5 |
| 5,612,820 | 3/1997 | Schrenk et al. | 359/498 |
| 5,619,355 | 4/1997 | Sharp et al. | 349/78 |
| 5,621,486 | 4/1997 | Doany et al. | 348/756 |
| 5,627,666 * | 5/1997 | Sharp et al. | 349/74 |
| 5,658,490 * | 8/1997 | Sharp et al. | 252/299.01 |
| 5,686,931 | 11/1997 | Fünfschilling et al. | 345/88 |
| 5,692,820 | 12/1997 | Gale et al. | 353/77 |
| 5,706,063 | 1/1998 | Hong | 349/9 |
| 5,738,426 | 4/1998 | Daijogo et al. | 353/31 |
| 5,822,021 * | 10/1998 | Johnson et al. | 348/742 |
| 5,929,946 * | 7/1999 | Sharp et al. | 349/18 |
| 5,999,240 * | 12/1999 | Sharp et al. | 349/119 |

OTHER PUBLICATIONS

World Scientific Publishing Co. Pte. Ltd., *Liquid Crystals, Applications and Uses,* vol. 1, Ch. 4, Physical Properties of Liquid Crystals, pp. 139–170 and Ch. 10, *Twisted Nematic and Supertwisted Nematic Mode LCDs,* pp. 231–274 (1990).

*Liquid Crystal Display,* Ch. 8, §§8.1, 8.2, & 8.3 (pp. 181–251) (no date) (best available copy).

Tom Baur, et al., High Performance Liquid Crystal Device Suitable for Projection Display, SPIE vol. 2650 (1996) (pp. 226–228).

A.V. Parfenov et al., Advanced optical schemes with liquid crystal image converters for display applications, SPIE vol. 2650 (1996) (pp. 173–178).

Cecile Joubert, et al., "Dispersive Holographic Microlens Matrix for LCD–Projection," SPIE vol. 2650 (Mar. 1996) (pp. 243–252).

IBM Technical Disclosure Bullentin, vol. 40, No. 3, Mar. 1997, p. 43, New York, U.S., "Reflective Polarizers with Projection Displays".

* cited by examiner

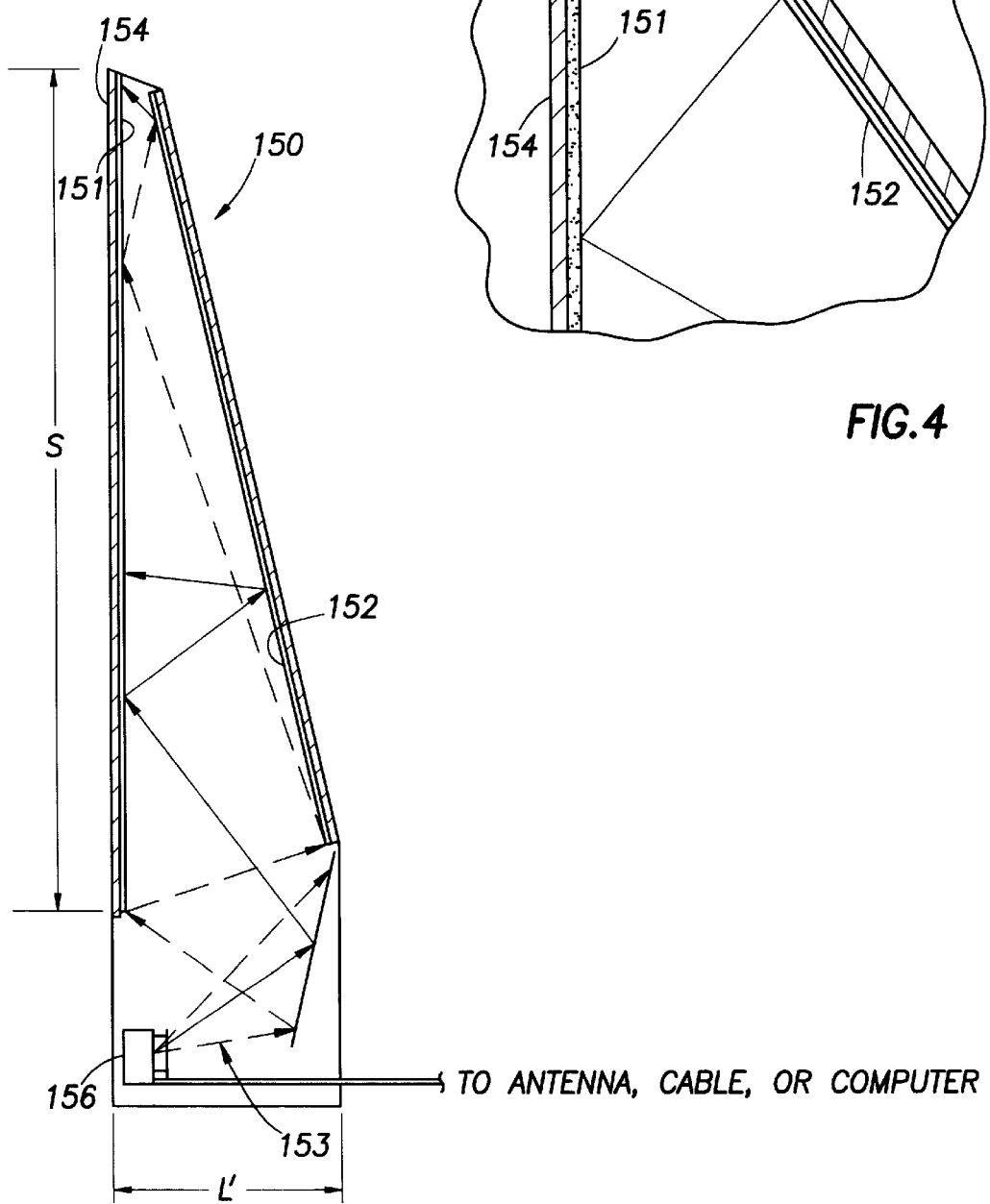

LIQUID CRYSTAL COLOR SHUTTERS THAT INCLUDE REFLECTIVE POLARIZERS THAT PASS COLOR COMPONENTS OF LIGHT OF A FIRST POLARIZATION AND THAT REFLECT A MAJORITY OF COLOR COMPONENTS OF LIGHT OF A SECOND POLARIZATION

This application claims the benefit of U.S. Provisional Application No. 60/054,292 filed Jul. 31, 1997.

BACKGROUND OF THE INVENTION

1. Field of the Invention

The invention relates to color shutters developed using liquid crystal (LC) active elements, and more particularly to a color shutter using a reflective polarizer.

2. Description of the Related Art

Conventional projection displays have used different systems for providing each color of red, blue and green. In many variations, separate CRTs were used. In other variations, separate transmissive liquid crystal panels were used. In either case, three separate systems were required, which greatly increased the cost of the projection display. Recently there have been efforts using liquid crystal panels and DMDs, as developed by Texas Instruments, to reduce cost by using a single device instead of three separate devices. This fundamental change from spatial to sequential operation resulted in a reduced cost of the overall projection display. However, problems related to developing the sequential color fields were created. White light had to be sequentially provided from a lamp to the imager device as red, green and blue light. Some form of color wheel or color shutter was used for this purpose. Conceptually the color wheel contained three transmissive sections, i.e., red, green, and blue. As the wheel rotated, each color of light was passed for a time by the filters in the wheel.

However, the color wheel is not a preferred solution in many cases, because of the physical size needed to provide a reasonable time for each sequential color. Liquid crystal-based color shutters would be preferred, as they are typically small. Liquid crystal color shutters, however, use absorptive polarizers in their operation. Generally, the LC color shutters use some form of polarization of the different colors of light combined with a rotation by the LCs. The rotated light is then absorbed by various polarizers. The light energy must be absorbed by the polarizers to provide the desired effect. This is acceptable in the original uses in color cameras, but becomes a problem for high power lamps used for projection displays. To get sufficient light to the screen, in either front or rear projector applications, a very large amount of light must be provided from the lamp. The various losses in the system, which may approach 99%, reduce the light levels to the final projected level. As a result, the light level at the color shutter, which is placed relatively early in the light path, is very high. Thus, the absorptive polarizers would be required to absorb large amounts of light, much more than they could reasonably bear. The color shutters would either fail or breakdown in the short term or degrade in the long term due to improper thermal effects. Therefore, LC color shutters are not a reasonable alternative to the color wheel. The designer is left without a good solution for the single imager, sequential projection display system.

SUMMARY OF THE INVENTION

The invention relates to providing a reflective polarizer in LC-based color shutters in place of the absorptive polarizer. By using a reflective polarizer, the light being filtered is not absorbed, but is reflected. Thus, the total energy being absorbed by the system is greatly reduced, so that the color shutter can be used in projection applications. Additionally, if the lamp used in the system is capable of utilizing the reflected light, overall system efficiency is increased.

In one aspect, the invention features an apparatus that includes a color shutter. The color shutter includes a reflecting polarizer adapted to pass light of a polarization and to reflect light of other polarizations.

BRIEF DESCRIPTION OF THE DRAWINGS

Other objects and advantages of the invention will become apparent upon reading the following detailed description and upon reference to the drawings in which:

FIG. 3 is an illustration of an extra-folded rear projection system using a sequential color image engine;

FIG. 4 is a detailed illustration of a portion the light path of the system of FIG. 3;

FIGS. 6–16 are illustrations of various color shutters in accordance with various alternative embodiments of the invention, which could be used in the projector and projection systems of FIGS. 1, 2 and 3.

Figure 1:
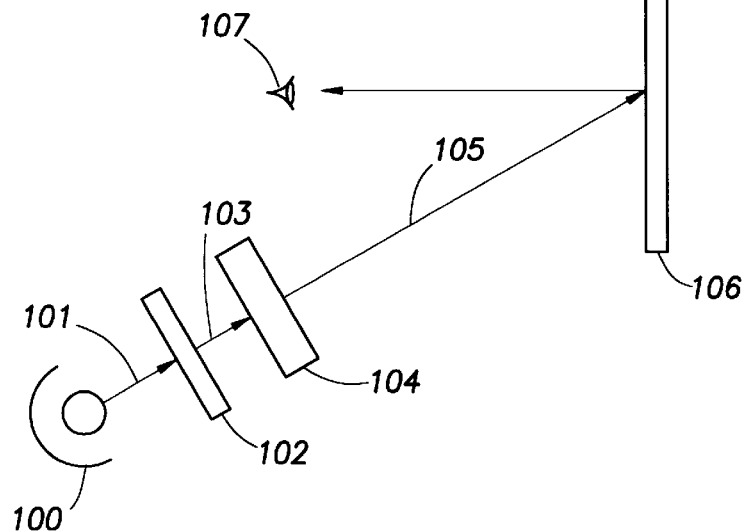
FIG. 1 is an illustration of a front projector using a sequential color image engine.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that even if such a development effort might be complex and time-consuming, it would nevertheless be a routine undertaking for those of ordinary skill in the art having the benefit of this disclosure.

In accordance with embodiments of the invention, color shutters can be used in projection systems without destruction, failure or degradation of the shutters, either long or short term.

FIG. 1 is an illustrative sequential front projection system. A lamp 100 provides white light 101 to a color shutter 102. The shutter 102 converts the white light 101 into sequential red, green and blue light 103, which is provided to a transmissive image engine 104. The image engine 104 operates in concert with the color shutter 102 to provide the proper combination to form a three color image 105. The image 105 then passes from the image engine 104 to a front projection screen 106, where it is reflected to a viewer 107.

Figure 2:
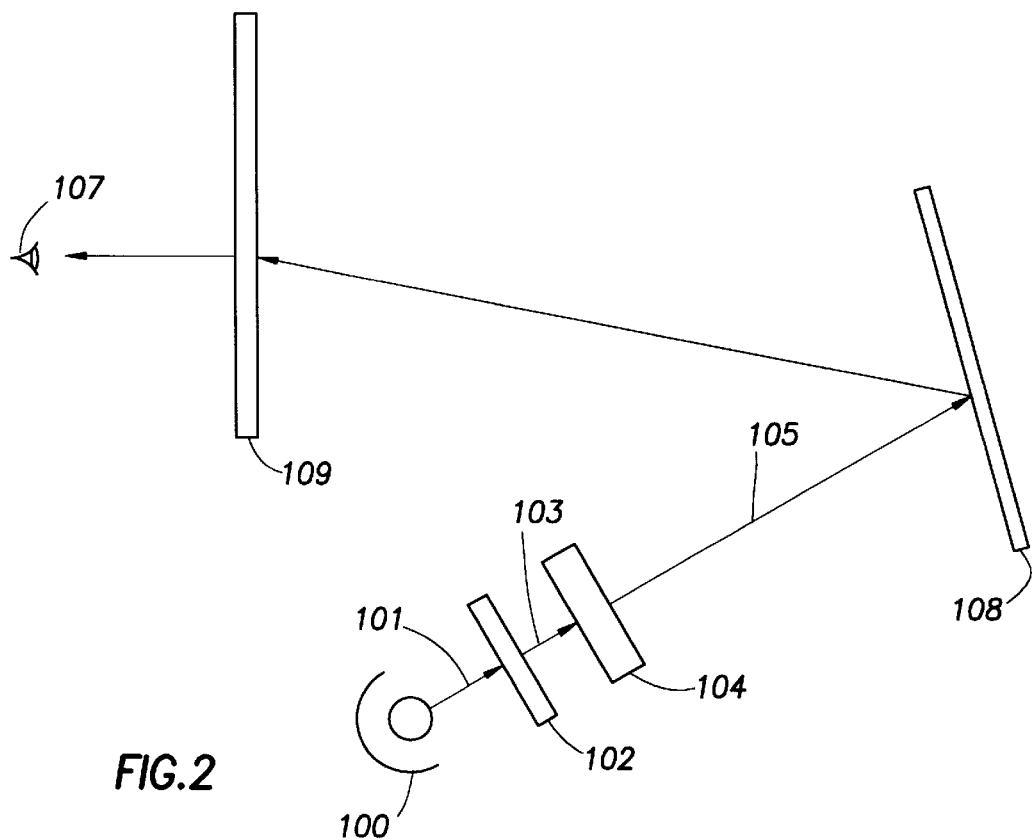
FIG. 2 is an illustration of a rear projection system using a sequential color image engine.

Similarly, FIG. 2 is illustrative of a simple rear projection system. The lamp 100, color shutter 102 and image engine 104 are similar to those of FIG. 1, except the image 105 from the image engine 104 passes to a mirror 108, where it is reflected to a rear projection screen 109, through which it passes to the viewer 107.

FIGS. 3 and 4 show a rear projection video system 150 that includes a reflecting linear polarizer 151 and an achromatic retarder 152 that allow light in a projected image 153 to reflect from a display screen 154 at one instance and to pass through the screen 154 at another instance. This allows for additional "optical folding." Such optical folding enables the video system 150 to be very shallow (i.e., footprint L'), yet project a large image, as described in U.S. Patent application Ser. No. 08/581,108, filed Dec. 29, 1995, and Ser. No. 08/767,967, filed Dec. 17, 1996, both entitled "Projecting Images," which are incorporated by reference herein in their entirety. Preferably the reflecting linear polarizer 151 is made of double brightness enhancement film (DBEF), also referred to as multilayer optical film (MOF), commercially available from Minnesota Mining & Manufacturing Company. For the video system 150 to work properly, an image engine 156 must produce polarized light. A variety of other types of video systems employ polarization in image formation.

Figure 5:
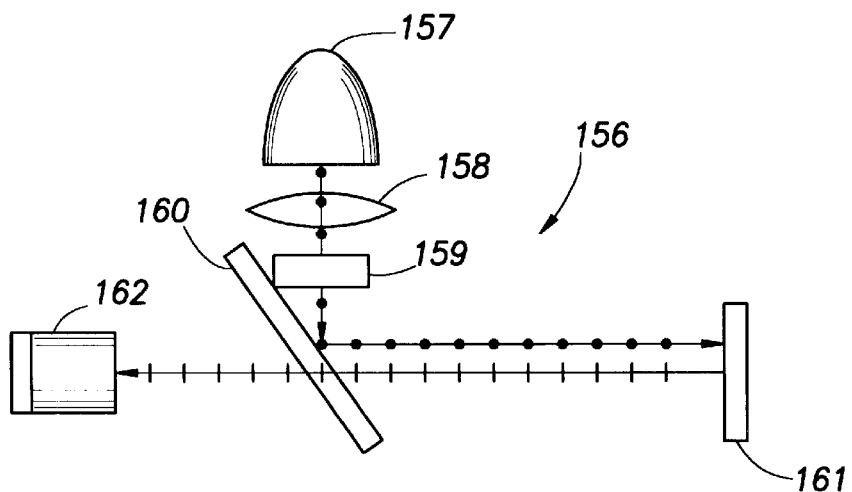
FIG. 5 is a detailed illustration of the lamp and engine of the system of FIG. 3.

FIG. 5 is a top view of a lamp 157 and the image engine 156 of the system in FIG. 3. The lamp 157 forms part of the image engine 156. Light from the lamp 157, which preferably is substantially of a single polarization, is passed through collimating and homogenizing lens system 158 to a color shutter 159. The polarized light output from the shutter 159 then impinges on a reflecting linear polarizer 160, preferably formed of DBEF (or MOF). Light of the proper polarization is reflected to a single reflecting/polarizing LCD 161. The reflecting/polarizing LCD 161 then receives red, green and blue data during the appropriate period in synchronization with the shutter 159. The LCD 161 is a quarter wave retarder for "ON" pixels, so that the light reaching and reflecting from the ON pixels has polarization rotated by 90° (i.e., in double pass) on the return path to pass through the reflecting linear polarizer 160. This is schematically shown in FIG. 5. Light in (i.e., reaching) "OFF" pixels is not rotated upon reflection from the reflecting/polarizing LCD 161 and is reflected by the reflecting linear polarizer 160. Thus, the image is provided from the LCD 161 through the reflecting linear polarizer 160 to imaging optics 162 and then to the rest of the system. More details on the image engine 156 are provided in U.S. patent application Ser. No. 08/730,818, filed Oct. 17, 1996, entitled "Image Projection System Engine Assembly," which is incorporated by reference herein in its entirety.

As noted, color shutters include at least one linear polarizer, typically as the first element, and in some cases may include additional linear polarizers. Prior art color shutters have included absorptive polarizers, which absorb any improperly polarized light. This is adequate in low power applications, but unacceptable in high power applications. Therefore, in accordance with embodiments of the present invention, the above projection systems incorporate color shutters that incorporate a reflecting linear polarizer or polarizers, such as DBEF (or MOF). The reflecting linear polarizer or polarizers are used instead of the absorptive linear polarizer or polarizers. A simple absorptive linear polarizer can be provided for better performance after the reflecting linear polarizer for final clean-up of the light. This combination of a reflecting linear polarizer and an absorptive polarizer can be used as the incoming polarizer in the color shutter, as any exit polarizer, and at intermediate polarizer positions. Detailed illustrations of various embodiments are now discussed.

Figure 6:
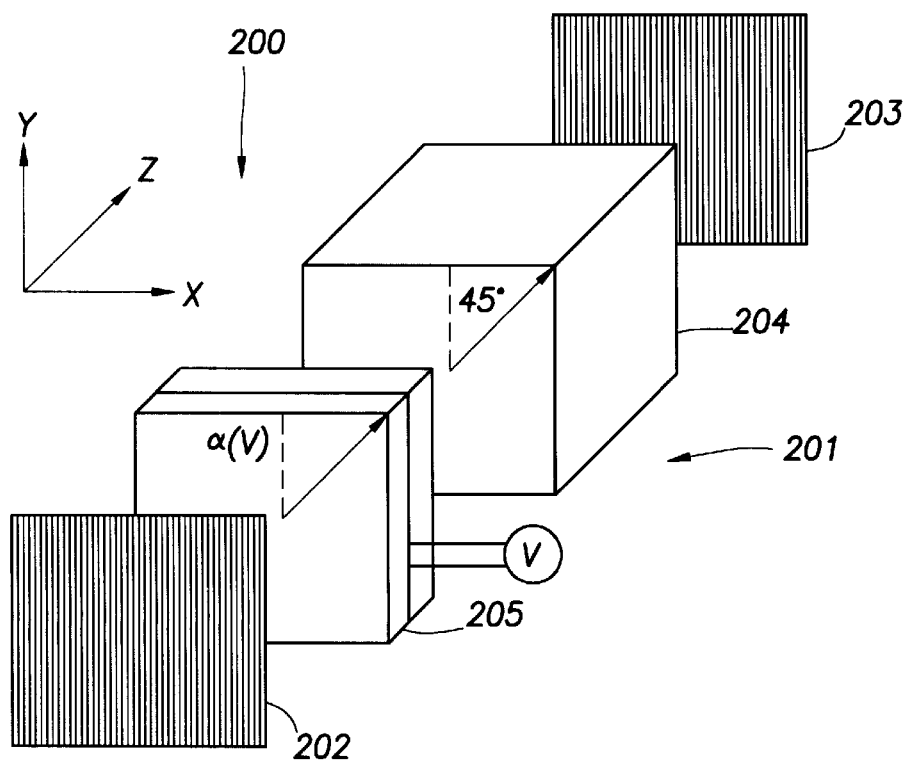
Figure 7:
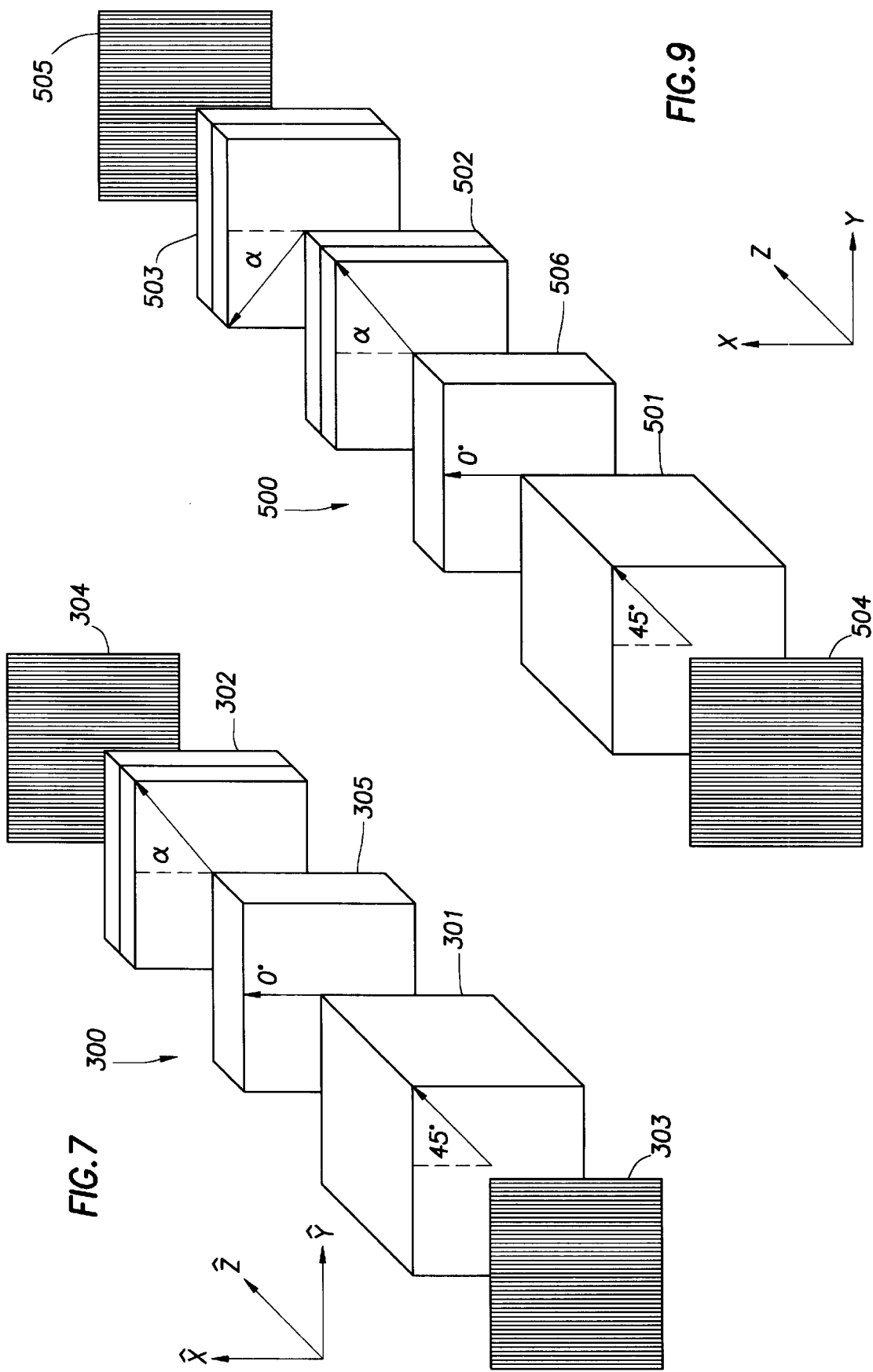
Figure 8:
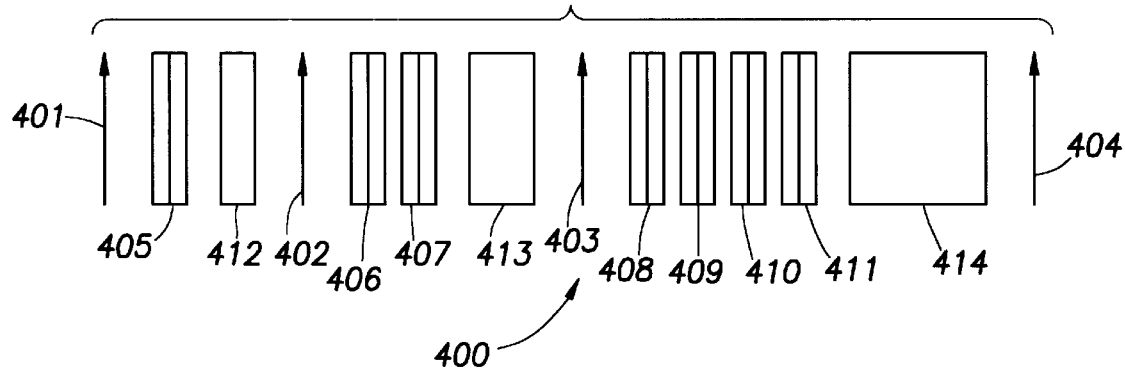

FIGS. 6, 7 and 8 are based on color shutters described in U.S. Pat. No. 5,132,826, issued Jul. 21, 1992 and entitled "Ferroelectric Liquid Crystal Tunable Filters and Color Generation," which is incorporated by reference herein in its entirety. This patent provides a detailed description of the basic color shutter or filter operation. In accordance with embodiments of the invention, reflecting linear polarizers, preferably in combination with a clean-up absorptive linear polarizer, are used instead of the neutral density absorptive linear polarizers.

FIG. 6 illustrates a single stage of a ferroelectric liquid crystal (FLC), for example, a smectic discretely tunable Lyot-type filter or color shutter 200. The net retardation of the stage can be modulated by electronically rotating the crystal axes [α(V)] of the FLC waveplate. A filter stage 201, defined by entrance 202 and exit 203 reflecting linear polarizers, contains a fixed birefringent element 204 and an FLC cell 205. Light propagates along the z axis of the cartesian coordinate system defined in FIG. 6. The faces of the birefringent element 204 and the FLC cells 205 are normal to the z axis, while the electric vector of light transmitted by the polarizers lies along the y axis. The optic axes of the waveplates 205 are in the plane normal to the z axis. To describe the operation of a typical fixed frequency birefringent Lyot-type filter, it is initially assumed that the optic axis of the FLC 205 is oriented along the y axis, transmitting the field with no retardation (the unswitched state). For the case in which the fixed birefringent element 204 is rotated by 45° about the z axis (the switched state), the incident linearly polarized light is divided into two equal amplitude eigenwaves, which travel at different phase velocities through the birefringent material 204. A retardation occurs between the two waves upon passage through the birefringent element 204. The two waves interfere at the exit reflecting linear polarizer 203 polarizer (positioned in this case parallel to the entrance reflecting linear polarizer 202) such that only wavelengths that are in phase achieve unity transmission.

The transmission of a multiple stage filter is the product of the intensity transmittances of the individual filter stages. In a conventional Lyot filter, the thickness of each birefringent element 204 is always twice that of the previous stage. Each subsequent stage exhibits a transmission spectrum with half the spectral period of the previous stage and, therefore, provides blocking for the following stage.

FIG. 7 illustrates the operation of an FLC, for example, a smectic A* (FLC), continuously tunable filter (LCTF) 300. The direction of propagation of light is along the z axis, and the faces of birefringent plates 301 and FLCs 302 are normal to the z axis, with reflecting linear polarizers 303, 304 oriented along the x axis. Since the birefringent element 301 is rotated by 45° with respect to the x axis, the input is divided into two equal amplitude waves, which travel at different phase velocities through the material. The two waves are retarded relative to each other upon passage through the birefringent element 301.

In general, the polarization of broad-band light exiting the birefringent element 301 is elliptical, with field components parallel and perpendicular to the direction of the input polarization. The field exiting the birefringent element 301 is incident on an achromatic quarter-wave plate 305, which functions as an ellipticity analyzer. The achromatic quarter-wave plate gives a retardation of π/2, independent of wavelength, bringing the quadrature field components into phase. Therefore, the achromatic quarter waveplate 305 converts elliptical polarizations into linear polarizations with wavelength-dependent orientation. Since the two components are in phase, this represents a linearly polarized field oriented at an angle. Tuning is accomplished by simply following the achromatic quarter-wave plate 305 (after the FLC 302) with the rotatable exit reflecting linear polarizer 304, which selects the desired wavelength.

A three-stage, discretely tunable Lyot-type filter 400 incorporating smectic C* FLC wave plates is shown in FIG. 8. This device contains four reflecting linear polarizers (P1–P4) 401, 402, 403, and 404, seven FLC waveplates (LC1–LC7) 405, 406, 407, 408, 409, 410, and 411, and three birefringent elements (B1–B3) 412, 413, and 414. The four reflecting linear polarizers 401, 402, 403, and 404 are all parallel. The three fixed birefringent elements 405, 406, and 407, one in each stage, retard light at the design wavelength by one wave, two waves, and four waves, respectively. In the unswitched state of the filter 400, the optic axes of each of the FLCs in a stage of the filter 400 are parallel to the plane of polarization of light entering that stage. The transmission spectrum of the filter 400 in the unswitched state depends on the combined retardation of the birefringent elements 412, 413, 414. The FLCs of the filter 400 can be synchronously switched between the unswitched state and the switched state (in which the optic axes of the cells are at 45° with respect to the polarization entering the stage) by application of a voltage step.

The reflective nature of the reflecting linear polarizers, preferably at the first reflecting linear polarizer (e.g., 202, 303, 401), means that the wrong polarization light is not absorbed, but is instead reflected. If the lamp is capable of absorbing the reflected energy, as in the lamp system described in U.S. Patent application Ser. No. 08/747,190, filed Nov. 12, 1996, entitled "High Efficiency Lamp Apparatus for Producing a Beam of Polarized Light," which is incorporated by reference herein in its entirety, the reflected energy can be reused in the system. Otherwise the energy can be absorbed by other elements better suited to the task than the color shutter. The clean-up absorptive polarizer would not be required in this embodiment; however, because the preferred reflecting linear polarizing material DBEF (or MOF) may not be a perfect polarizer, the clean-up polarizer is preferably included for improved results. The clean-up absorptive polarizer would actually absorb very little light, because the amount of off-polarization light passing through the DBEF (or MOF) is small. Therefore, the clean-up polarizer does not substantially have the problems of the prior art.

Any absorptive linear polarizers in the color shutter after the first polarizer can be replaced (e.g., with polarizers 203, 304, 404), in accordance with embodiments of the invention, but are not required to be replaced. The majority of the reflection is done at the first polarizer (e.g., 202, 303, 401), so the benefit is reduced at the later polarizers. However, certain additional advantages are gained by the replacement, particularly of any prior exit absorptive linear polarizer (e.g., by linear reflective polarizers 203, 304, 404). The later stage replacements will reflect incorrectly polarized light back through the earlier stages of the color shutter. This reflected light will be absorbed by these various other stages in the color shutter due to insertion losses. The thermal balance of the shutter will thus be improved by spreading out the absorption over many components rather than limiting it to a few components.

Figure 10:
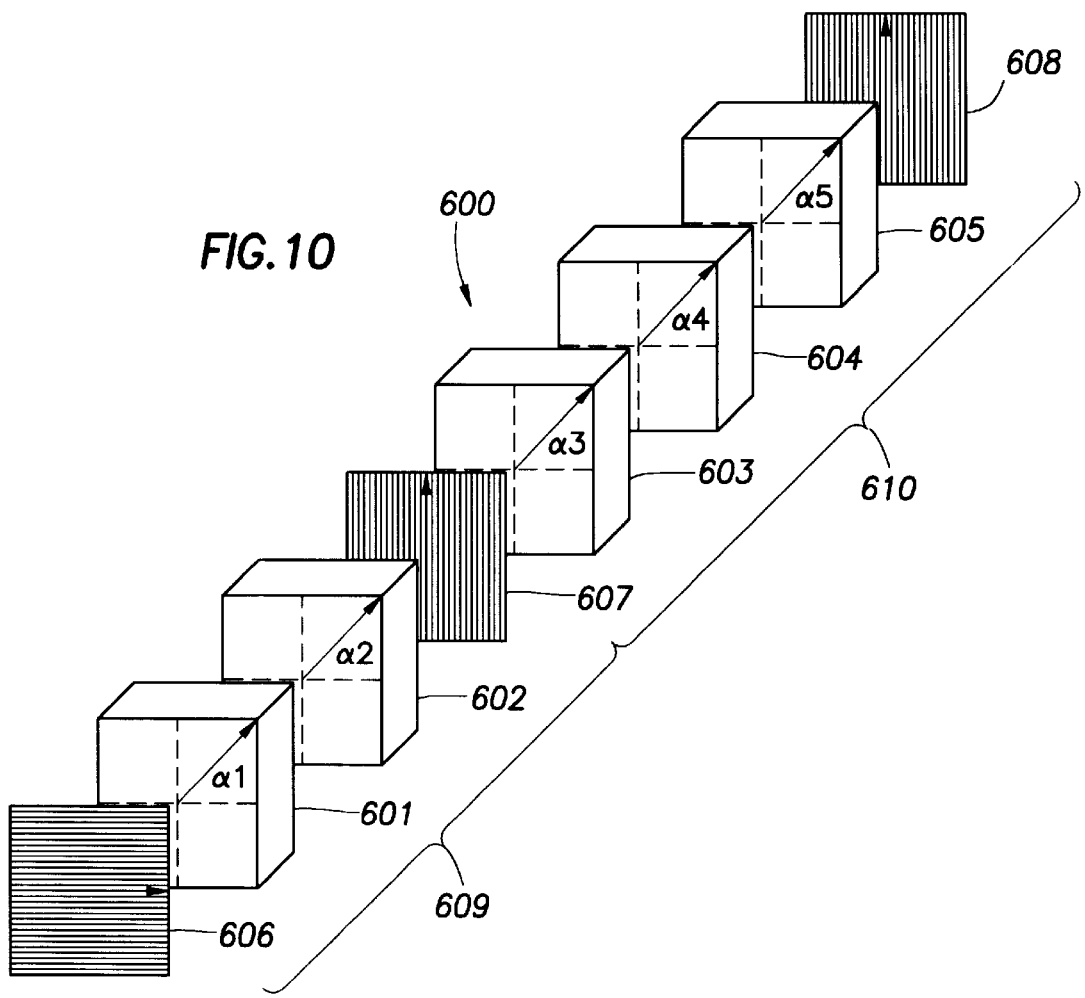

FIGS. 9 and 10 are based on color shutters described in U.S. Pat. No. 5,243,455, issued Sep. 7, 1993 and entitled "Chiral Smectic Liquid Crystal Polarization Interference Filters," which is incorporated by reference herein in its entirety. This patent provides a detailed description of the basic color shutter or filter operation. In FIGS. 9 and 10, in color shutters 500 and 600, the absorptive linear polarizers of the prior art are replaced with reflecting linear polarizers, in accordance with embodiments of the invention. The color shutters 500 and 600 preferably include a clean-up absorptive linear polarizer, as discussed above.

FIG. 9 illustrates a single stage FLC, a chiral smectic liquid crystal (CSLC), for example, a chiral smectic A* FLC, continuously tunable filter or color shutter 500 containing two FLC half-waveplates, the optic axis of which are rotatable in opposite directions in order to increase the tuning range. The device is tuned to a desired wavelength by electronically rotating the optic axis of the FLC half-waveplates. The direction of propagation of light is along the z axis. The faces of birefringent element 501 and CSLCs 502 and 503 are normal to the z axis, with reflecting linear polarizers 504 and 505 oriented along the x axis. Since the optic axis of the fixed birefringent element 501 is oriented by 45° with respect to the x axis, the input is divided into two equal amplitude waves, which travel at different phase velocities through the material. The two waves have a phase retardation at the exit of the birefringent element 501.

In general, the polarization of broad-band light exiting the birefringent element 501 is elliptical, with field components parallel and perpendicular to the direction of the input polarization. The field exiting the birefringent element 501 is incident on achromatic quarter-waveplate 506, which functions as an ellipticity analyzer. This element gives a retardation of π/2, independent of wavelength, bringing the quadrature field components into phase. Therefore, the achromatic quarter-waveplate 506 converts elliptical polarizations into linear polarizations with wavelength-dependent orientation. Since the two components are in phase, this represents a linearly polarized field oriented at an angle. Tuning is accomplished by simply following the achromatic quarter-waveplate 506 (i.e., after the CSLCs 502, 503) with the rotatable exit linear reflecting polarizer 505, which selects the desired wavelength. The FLC cells 502, 503 are cascaded in the filter 500 to increase the maximum tilt angle and expand the tuning bandwidth.

FIG. 10 illustrates the color shutter 600, which is a two-stage multiple wavelength blocking filter, incorporating fast switching surface stabilized FLC (SSFLC) cells (FLC 1–5) 601, 602, 603, 604, and 605. Reflecting linear polarizers (P1–P3) 606, 607, and 608 define stages 609 and 610. The two FLC cells 601 and 602 are in the first stage 609 bounded by the crossed reflecting linear polarizers 606 and 607, and the FLC cells 603, 604, and 605 are in the second stage 610, bounded by the parallel reflecting linear polarizers 607 and 608. The filter 600 is designed to selectively transmit three visible colors (red, green and blue), and is capable of rapid color switching to generate a visual display of a continuous range of visible colors.

The color shutter 600 provides FLC cell color blocking filters that include the reflecting linear polarizers 606, 607, 608 in accordance with an embodiment of the invention. Three independent two-stage birefringent filter designs in the filter 600 are electronically selectable. The five FLC cells each have a selected liquid crystal thickness. The arrows on the FLC cells 601–605 at the angles ($\alpha_1$–$\alpha_5$) represent the orientation of the optic axes of the FLC cells relative to the input polarizer 606. These angles can be either 0 or $\pi/4$, depending on the switching states of the FLC cells 601–605. The transmission of the filter 600 is the product of the transmission spectra of the individual stages. Multiple independently switchable FLC cells can produce multiple transmission spectra.

Figure 11:
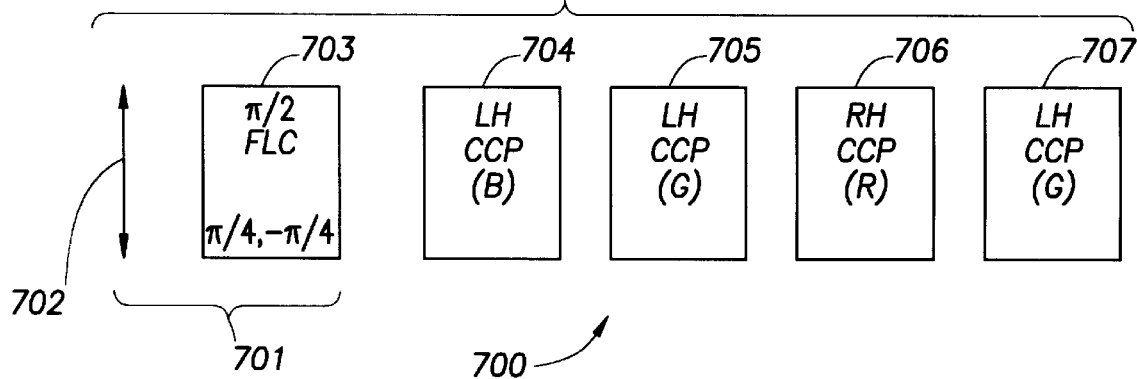

FIG. 11 is based on a color shutter described in U.S. Pat. No. 5,619,355, issued Apr. 8, 1997 and entitled "Liquid Crystal Handedness Switch and Color Filter," which is incorporated by reference herein in its entirety. The patent provides a detailed description of the basic color shutter or filter operation. FIG. 11 shows a color shutter 700, which is a reflection mode two-color filter employing a liquid crystal handedness switch, that has an absorptive polarizer replaced by a reflecting linear polarizer and preferably includes a clean-up absorptive linear polarizer, as discussed above.

The color shutter 700 includes a smectic liquid crystal handedness switch 701 consisting of reflecting linear polarizer 702 optically coupled with an FLC quarter-wave retarder plate 703. An FLC half-wave plate optically coupled to a passive quarter wave retarder (not shown) can be used instead, in certain embodiments. In other embodiments, the active and passive wave plates can be replaced by compound retarders.

Referring to FIG. 11, the orientation of the FLC cell 703 can be electrooptically switched between $\pi/4$ and $-\pi/4$ with respect to the axis of the reflecting linear polarizer 702. The component of unpolarized light incident on the reflecting linear polarizer 702 with polarization parallel to the axis of the polarizer 702 (i.e., parallel to the y-axis) is transmitted by the polarizer 702. For the FLC quarter-wave plate 703 being oriented at $\pi/4$, the light polarization is converted to left-handed circular polarization. For the FLC quarter-wave plate 703 being oriented at $-\pi/4$, the light polarization of output light is changed to right-handed circular polarization. The handedness switch 701 can also be operated in reverse, in certain embodiments of color shutters, as described in the aforementioned U.S. Pat. No. 5,619,355. In the color shutter 700, any embodiment of the handedness switch can be employed.

The handedness switch 701 is operable with polarized light or unpolarized light. The component of polarized light parallel to the reflecting linear polarizer 702 is transmitted and coupled to FLC 703. Light polarized along the axis of the polarizer 702 is transmitted in its entirety (neglecting losses at the polarizer 702). However, a linear polarized light source, such as a laser, can be used to produce linearly polarized light oriented along the y-axis. In this case, the linear polarizing means may be incorporated in the light source, and the polarizer 702 can be omitted.

The handedness switch 701 is used with devices sensitive to the handedness of the polarization of the incident light, for example, in the color shutter 700. These handedness-sensitive devices can be one or more cholesteric liquid crystal circular polarizers (CCPs). CCPs reflect one handedness of light within a wavelength band, but transmit light outside of the reflection band, as well as light of the opposite handedness.

Referring to FIG. 11, the color shutter 700 is a two-color filter, which provides two primary colors in transmission and two colors complementary to the primary colors in reflection. Following the handedness switch 701, the shutter 700 includes left-handed CCPs 704, 705 and right-handed CCPs 706, 707. One right- and one left-handed CCP have the same reflection band and the other two have different reflection bands.

FIGS. 12–16 are based on color shutters described in U.S. Pat. No. 5,347,378, issued Sep. 13, 1994 and entitled "Fast Switching Color Filters for Frame-Sequential Video Using Ferroelectric Liquid Crystal Color-Selective Filters," which is incorporated by reference herein in its entirety. The patent provides a detailed description of the basic color shutters or filters operation.

Figure 12:
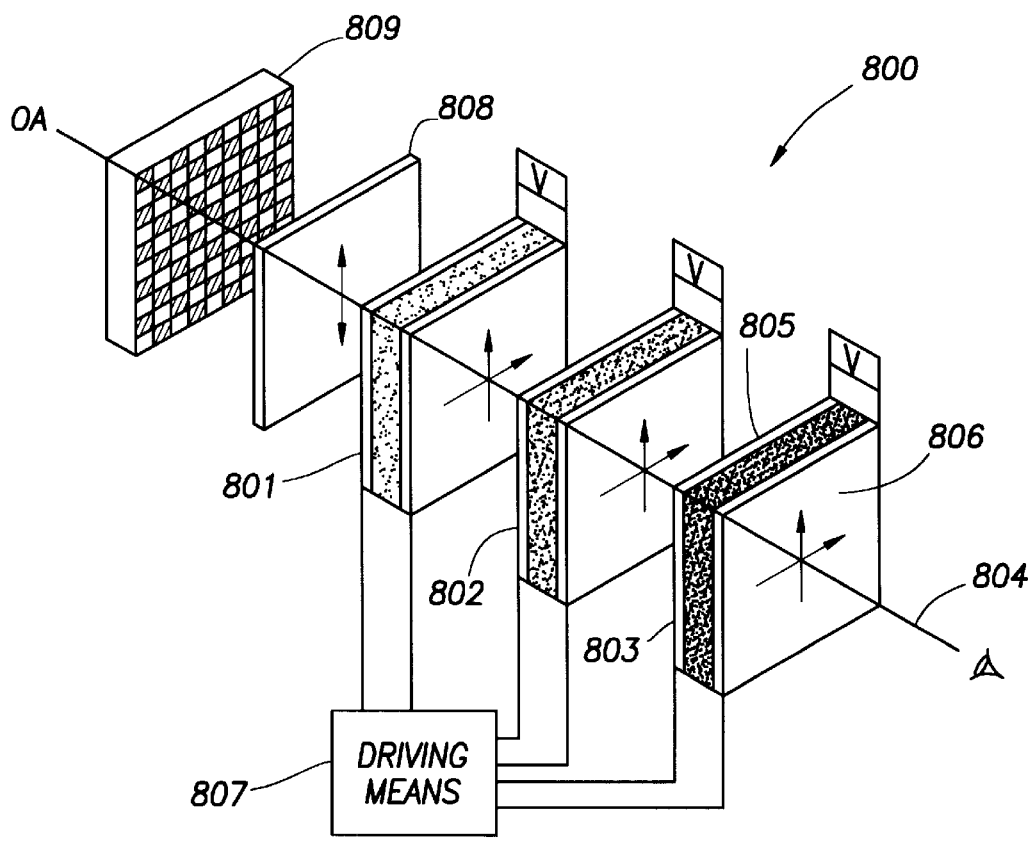

FIG. 12 shows the basic structure of a multilayer guest-host color filter 800. Three SSFLC cells 801, 802 and 803, are arranged optically in series along reference axis 804. Each cell contains a uniformly aligned, 45° tilt angle smectic C* FLC. Each of the liquid crystal cells 801, 802, 803 is oriented with its alignment direction parallel to a reference vertical. Leads connect sets of facing electrodes 805, 806 to an electrical driving means 807, which can independently switch each SSFLC cell 801, 802, 803. A reflecting linear polarizer 808 is placed adjacent to one end of the composite of SSFLC cells 801, 802, 803, with its axis parallel to the reference vertical, in accordance with an embodiment of the invention. This can be followed by a monochrome video display 809. The filter 800 may be illuminated from either end. The liquid crystal in each cell 801, 802, 803 is doped with one or more pleochroic dyes, which together selectively absorb light of a given wavelength region that is polarized parallel to the long axis of the dye molecule. All wavelengths are transmitted for light polarized perpendicular to this axis. The guest dye molecules orient themselves parallel to the liquid crystal host molecules and can be switched through 90° along with the liquid crystal host molecules when an electric field is applied. The dyes are chosen so the three liquid crystal cells can transmit red, green, and blue light, respectively, or, cyan, magenta, and yellow light, respectively. In the former case the primary colors are additive and only one liquid crystal cell is switched at a given time to transmit a primary color. In the latter case the primary colors are subtractive and two liquid crystal cells must be switched together to give a resulting primary color, which is additive. In both cases, a frame-sequential video system would generate an arbitrary color in time-sequential frames of the additive primary colors.

Figure 13:
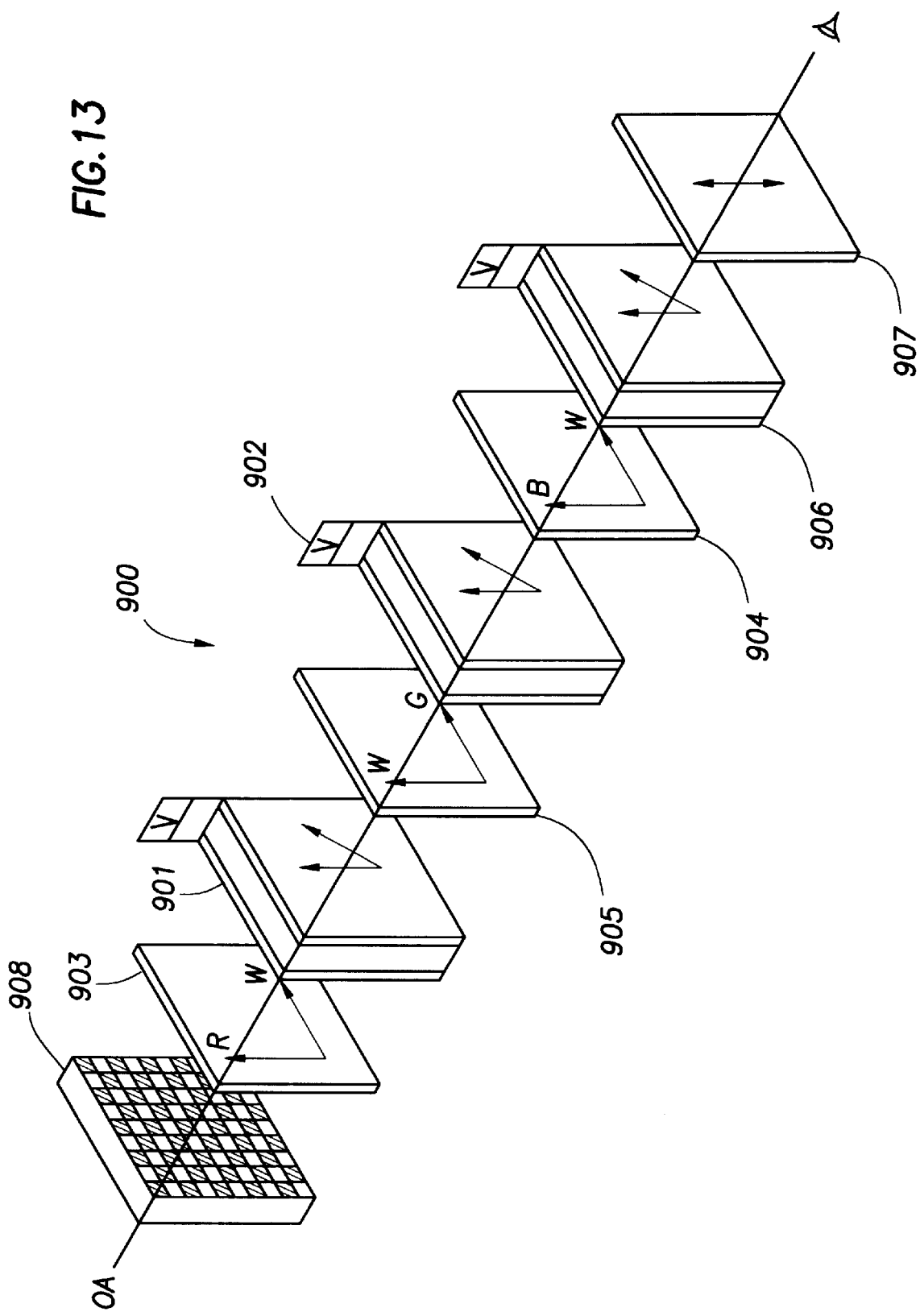

FIG. 13 shows the structure of a three-SSFLC pleochroic polarizer color-selective filter 900. The filter 900 employs two SSFLC cells 901, 902 and three pleochroic polarizers 903, 904, 905 to generate color, and a third (optional) SSFLC cell 906 and reflecting linear polarizer 907 to ensure that all the output colors are polarized in the same plane. The reflecting linear polarizer 907 also serves to greatly increase the color purity at the output. The filter 900 can be divided into three stages followed by the reflecting linear polarizer 907 and can work with a monochrome video display 908. Each stage consists of the primary-color pleochroic polarizer (i.e., 903, 904, or 905) followed by a 45° switching angle SSFLC device (i.e., 901, 902, or 906), as shown in FIG. 13. The color generating part of the filter consists of the pleochroic polarizer (blue-green) 903 and the pleochroic polarizer (red-green) 904, with the two SSFLC cells 901, 902 in between. Blue-green means, for instance, that blue and green are polarized along the same axis, and red light is unpolarized. The first SSFLC cell 901 is adjacent the blue-green polarizer 903 and the second SSFLC cell 902 is adjacent the red-green polarizer 904, with the third blue-red pleochroic polarizer 905 between the first and second cells 901 and 902. The axes of the end pleochroic polarizers 903 and 904 are oriented parallel to a reference vertical, while the middle pleochroic polarizer 905 has its axis in the orthogonal direction. The SSFLC devices are oriented with one of their optic axis directions parallel to the reference vertical, with the switching sense to the other optic axis direction being arbitrary. When both SSFLC cells 901, 902 are in the vertical state, the filter 900 transmits blue light, which is horizontally polarized. When the first SSFLC cell 901 is vertical while the second cell 902 is switched to its other optic axis state, the filter 900 transmits red light, which is vertically polarized. When both SSFLC cells 901, 902 are switched to their non-vertical state, the filter 900 transmits vertically polarized light of substantially all colors.

The optional third SSFLC cell 906, oriented in the same way as the first two, can be placed adjacent to the pleochroic polarizer 904, followed by the (color-neutral) reflecting linear polarizer 907 with its axis again oriented parallel to the reference vertical. The third SSFLC cell 906 is left vertical for the green and red filter states, but is switched to its other state for the blue-transmitting filter state. Adding the third SSFLC cell 906 enables the filter 900 to have all of its primary color states have the same output polarization. This is advantageous, for example, if the filter 900 is used in conjunction with a liquid crystal display that is polarization sensitive. The neutral reflecting linear polarizer also improves the overall color saturation of the filter 900 with most practical implementations of colored polarizers. It is obvious that the positions within the filter 900 of each pleochroic polarizer 903, 904, 905 can be rearranged, with correspondingly different switching combinations for each primary color, without departing from the scope of the invention.

Figure 14:
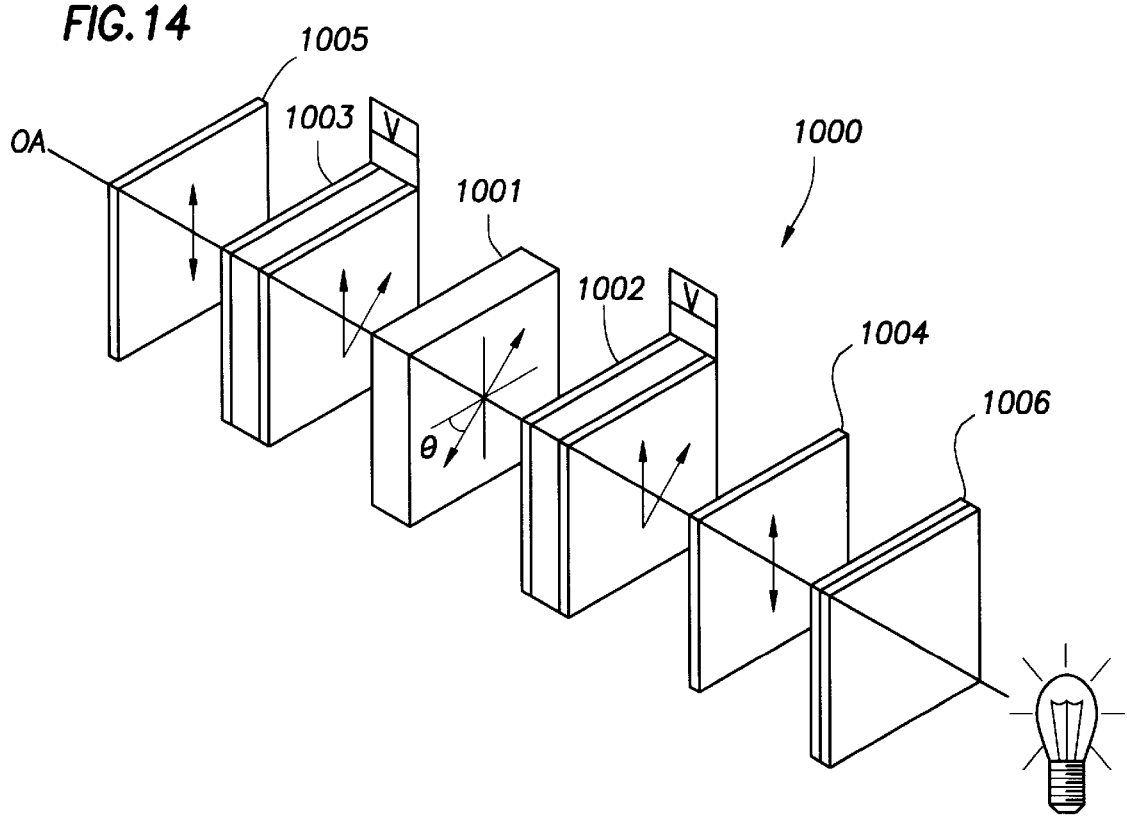
Figure 15:
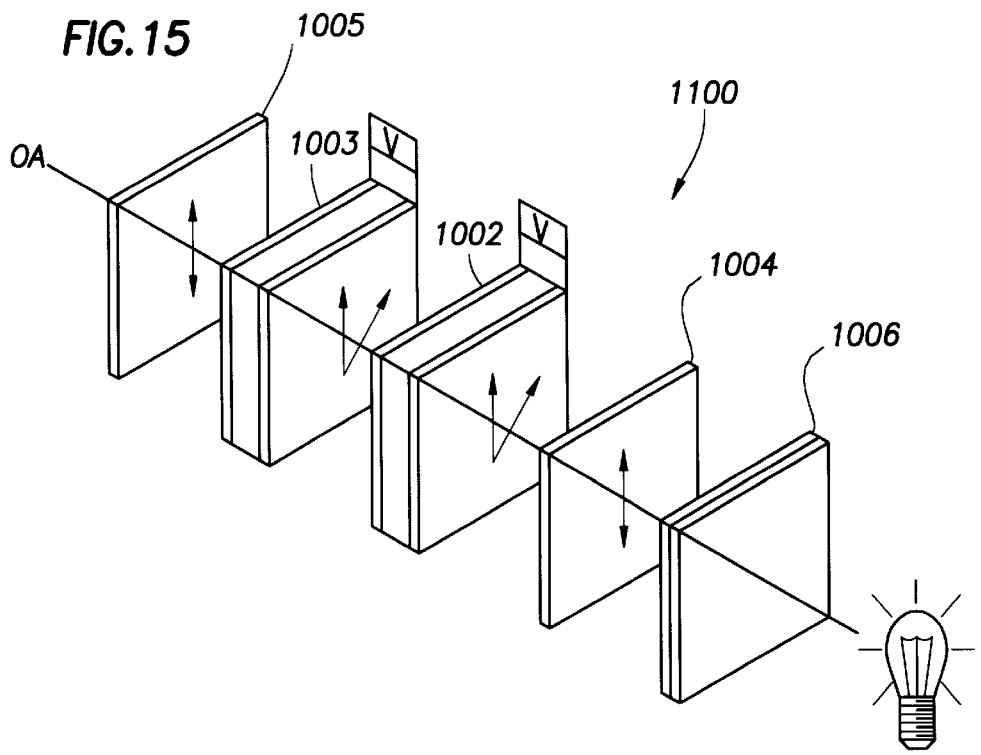
Figure 16:
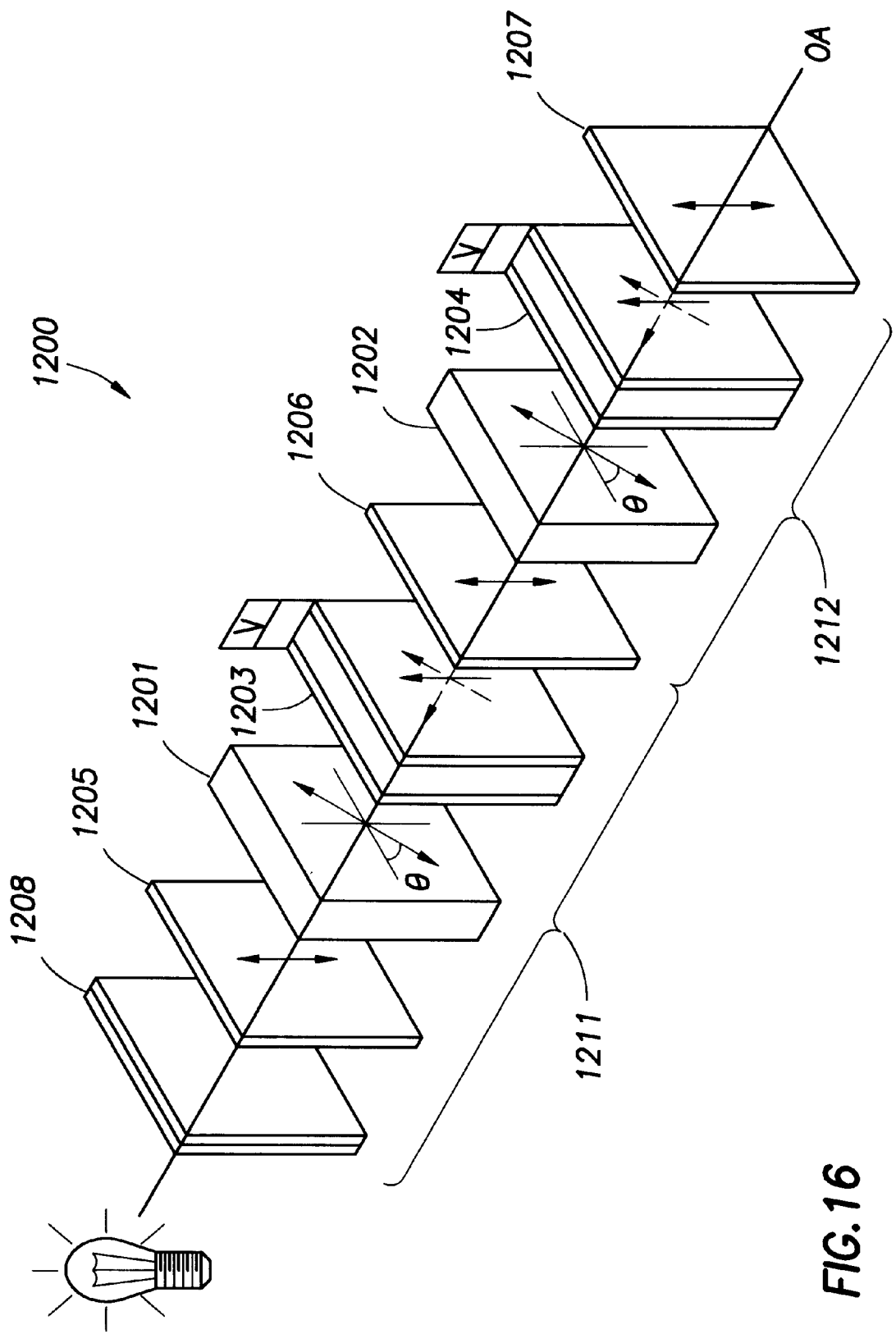

FIGS. 14, 15, and 16 show a 1-stage filter with a birefringent element, a 1-stage filter with no birefringent element, and a 2-stage filter, respectively, in accordance with embodiments of the invention. These are color-selective interference filters 1000, 1100, and 1200, respectively. In FIG. 14, the 1-stage filter 1000 consists of a birefringent element 1001, two SSFLC devices 1002, 1003, two reflecting linear polarizers 1004, 1005, an optional set of one or more colored filters 1006, an optional diffuser element (not shown), and a reflective surface (not shown). The birefringent element 1001 is situated between the two SSFLC devices 1002, 1003, and all three elements together are situated between the parallel reflecting linear polarizers 1004, 1005. The reflecting linear polarizers 1004, 1005 have their axes oriented parallel to a reference vertical and the optic axis of the birefringent element 1001 is oriented at 45° to this direction. The SSFLC devices 1002, 1003 contain a 45° switching angle FLC and are oriented so that their optic axes may be switched parallel to the optic axis of the birefringent element 1001, or parallel to the axes of the reflecting linear polarizers 1004, 1005. FIG. 15, which illustrates the 1-stage filter 1100, is a special case of the 1-stage filter 1000 shown in FIG. 14. The 1-stage filter 1100 is constructed exactly as described for the filter 1000, except there is no birefringent element, such as the element 1001.

Referring to FIGS. 14 and 15, if the input light contains objectionable violet wavelengths, removal may be effected by a passive filter that always blocks transmission of violet light. Such a filter 412 can be placed anywhere in the path of the selective-color filter system 1000, 1100, including at the input, before the reflecting linear polarizer 1005, as shown in the FIGS. 14 and 15. More details on the operation of the filters 1000 and 1100 are included in the aforementioned U.S. Pat. No. 5,347,378.

The 2-stage filter 1200 shown in FIG. 16 consists of two birefringent elements 1201, 1202, two SSFLC devices 1203, 1204, three reflecting linear polarizers 1205, 1206, 1207, and an optional diffuser element (not shown). For certain embodiments, a colored filter system 1208 (shown in FIG. 16), as described in reference to the 1-stage filters 1000, 1100, and/or a reflecting surface are also included. In each stage 1211, 1212 of the 2-stage filter 1200, the birefringent element 1201, 1202 is placed adjacent to the SSFLC device 1203, 1204 (the order being unimportant) with both elements (i.e., one of the birefringent elements and one of the SSFLC devices) together being situated between the reflecting linear polarizer (i.e., between the polarizers 1205, 1206 and between the polarizers 1206, 1207, respectively). The second polarizer 1206 of the first stage 1211 also serves as the first polarizer for the second stage 1212. The reflecting linear polarizers 1205, 1206, 1207 have their axes oriented parallel to a reference vertical, and the optic axis of each of the birefringent elements 1201, 1202 is oriented at 45° to this direction. Each SSFLC device 1203, 1204 contains a 45° switching angle FLC and is oriented in either of two ways: the first way allows the optic axis of the device to be switched between the polarizer (1205, 1206, 1207) axis direction and a direction parallel to the optic axis of the birefringent element 1201, 1202; the second way allows the same optic axis to be switched between the polarizer (1205, 1206, 1207) axis direction and a direction perpendicular to the optic axis of the birefringent element 1201, 1202. One of these two geometries is employed in obtaining the three primary colors, depending upon the 2-stage filter 1200 being used.

The 2-stage filter 1200 embodiments can be operated in either the reflective or the transmissive mode. For operation in the reflective mode, a reflective surface is placed at one end of the 2-stage filter 1200 adjacent to the reflecting linear polarizer (i.e., adjacent to 1205 or 1207). The opposite end then becomes the input and output to the filter 1200 and a diffuser element may be situated at this end. Some of the embodiments employ one or more of the colored glass filters 1208 to improve the color saturation while others do not.

Figure 17C:
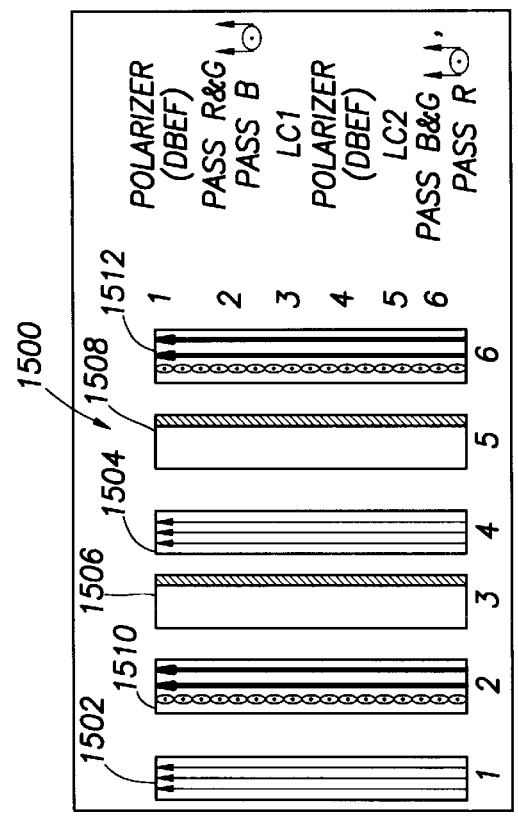
FIGS. 17A, 17B and 17C are illustrations of two-color shutters in accordance with embodiments of the invention.
Figure 17A:
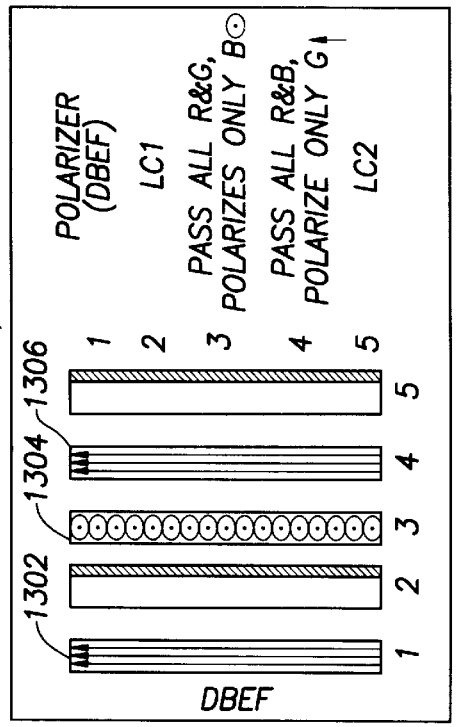
Figure 17B:
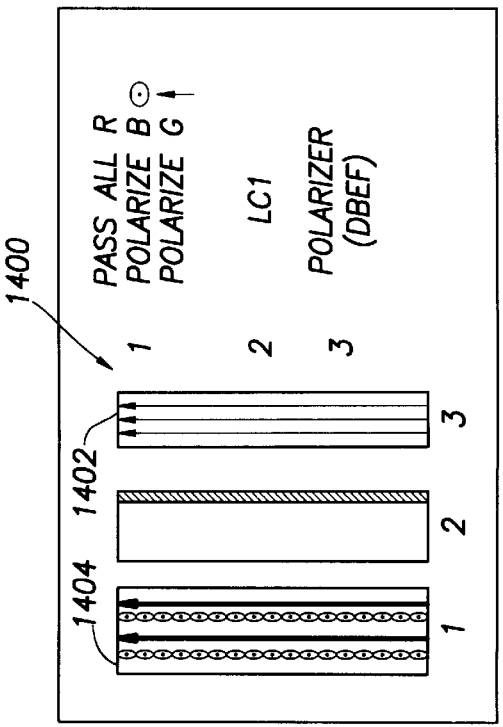

FIGS. 17A, 17B and 17C show color shutters 1300, 1400, and 1500, respectively. The shutters 1300, 1400, 1500 are other variations of two-color shutters that use a linear polarizer. The linear polarizer is a reflecting linear polarizer, in accordance with embodiments of the invention, preferably with a clean-up absorptive linear polarizer. FIGS. 17A and 17B show the color shutters 1300 and 1400 that include reflecting linear polarizers 1302 and 1402, respectively. FIG. 17C shows the color shutter 1500 that includes reflecting linear polarizers 1502 and 1504. Liquid crystal elements LC1 1506 and LC2 1508 in the color shutter 1500 provide controllable rotation of polarization to allow for color shutter 1500 operation. In these embodiments, preferably all red light polarizations are allowed to pass at all polarizers 1304, 1306 (in FIG. 17A), 1404 (in FIG. 17B), and 1510 and 1512 (in FIG. 17C) other than the linear polarizers, allowing green and blue light to be switched. The detailed operation of the various special polarizers 1304, 1306, 1404, 1510, and 1512 is indicated in legends to their respective FIGS. 17A, 17B, and 17C.

As described herein, in accordance with embodiments of the invention, color shutters that include reflecting linear polarizers can be used in projection display applications. The reflecting linear polarizers are used to reflect the light that would have been absorbed by prior art color shutters. Thus, the overheating and degradation problems have been resolved and projection display systems using sequential color operation can be built and operate reliably.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus comprising:
   a liquid crystal color shutter that sequentially filters different color components of light, the liquid crystal color shutter including a reflecting polarizer that passes first color components of light having a first polarization to provide the first color components to an image surface that is spaced apart from the liquid crystal color shutter and that reflects a majority of second color components of light having a second polarization that is different than the first polarization.

2. The apparatus of claim 1, wherein the reflecting polarizer comprises a reflecting linear polarizer.

3. The apparatus of claim 1, wherein the color shutter further comprises an active retarder that retards the first color components of light in a first operating state and that retards the second components of light in a second operating state.

4. The apparatus of claim 1, wherein the color shutter further comprises a clean-up polarizer.

5. The apparatus of claim 1, wherein the reflecting polarizer comprises an entrance polarizer and the color shutter further comprises an exit reflecting polarizer.

6. The apparatus of claim 5, wherein the exit reflecting polarizer comprises a clean-up polarizer.

7. The apparatus of claim 1, wherein the reflecting polarizer comprises multilayer optical film.

8. The apparatus of claim 1, wherein the color shutter comprises a plurality of reflecting polarizers adapted to retard light passing through the color shutter.

9. The apparatus of claim 1, wherein the reflecting polarizer comprises a substantially nonabsorbing reflecting polarizer.

10. The apparatus of claim 1, wherein the reflecting polarizer passes light through the liquid crystal color shutter to distrubute thermal energy.

11. The apparatus of claim 1, wherein the reflecting polarizer reflects light from the liquid crystal color shutter.

12. The apparatus of claim 1, wherein the color shutter is comprised in a tunable optical filter.

13. The apparatus of claim 1, wherein the color shutter further comprises stages including a reflecting polarizer stage.

14. The apparatus of claim 1, wherein the color shutter further comprises part of a field sequential color display system.

15. A liquid crystal color shutter that sequentially filters different color components of light, comprising:
   a reflecting polarizer, positioned in the liquid crystal color shutter, that sequentially passes first color components of light having a first polarization to provide the first color components to an image surface that is spaced apart from the liquid crystal color shutter and that reflects a majority of second color components of light having a second polarization that is different than the first polarization; and
   an active retarder, positioned in the liquid crystal color shutter, that retards the first color components of light in a first operating state and retards the second color components of light in a second operating state.

16. The color shutter of claim 15, wherein the color shutter further comprises a passive retarder adapted to impart a fixed retardation on one of light of the polarization and light retarded by the active retarder.

17. The color shutter of claim 16, wherein the passive retarder comprises a birefringent element.

18. The color shutter of claim 15, wherein the reflecting polarizer comprises a reflecting linear polarizer.

19. The color shutter of claim 15, wherein the reflecting polarizer comprises multilayer optical film.

20. The color shutter of claim 15, wherein the active retarder comprises ferroelectric liquid crystals.

21. The color shutter of claim 15, wherein the different operating states of the active retarder comprise discrete operating states.

22. The color shutter of claim 15, wherein the different operating states of the active retarder comprise continuous operating states.

23. The color shutter of claim 15, wherein the reflecting polarizer comprises a nonabsorbing polarizer.

24. The color shutter of claim 15, wherein the reflecting polarizer comprises a substantially nonabsorbing polarizer.

25. The color shutter of claim 15, further comprising a clean-up polarizer adapted to work with the reflecting polarizer.

26. The color shutter of claim 25, wherein the clean-up polarizer comprises an absorptive linear polarizer.

27. The color shutter of claim 15, further comprising stages, wherein each stage is defined by a plurality of reflecting polarizers and each stages comprises a plurality of active retarders.

28. The color shutter of claim 15, wherein the reflecting polarizer and the active retarder comprise part of a field sequential color display system.

29. The projection system of claim 15, wherein the reflecting polarizer comprises multiplayer optical film.

* * * * *